(12) United States Patent
Lightcap

(10) Patent No.: US 12,453,335 B2
(45) Date of Patent: Oct. 28, 2025

(54) SCRATCH PAD SIDE TABLE

(71) Applicant: Hilde & Phil LLC, Philadelphia, PA (US)

(72) Inventor: Jeremy A. Lightcap, Philadelphia, PA (US)

(73) Assignee: Hilde & Phil LLC, Philadelphia, PA (US)

( * ) Notice: Subject to any disclaimer, the term of this patent is extended or adjusted under 35 U.S.C. 154(b) by 148 days.

(21) Appl. No.: 18/467,070

(22) Filed: Sep. 14, 2023

(65) Prior Publication Data

US 2024/0090474 A1     Mar. 21, 2024

Related U.S. Application Data

(60) Provisional application No. 63/406,825, filed on Sep. 15, 2022.

(51) Int. Cl.
  *A01K 15/02*      (2006.01)
  *A47B 9/00*       (2006.01)

(52) U.S. Cl.
  CPC .............. *A01K 15/024* (2013.01); *A47B 9/00* (2013.01)

(58) Field of Classification Search
  CPC ........... A47B 9/00; A47B 13/00; A47B 37/00; A47B 83/04; A47B 2200/0084; A47B 2200/12; A01K 15/024
  See application file for complete search history.

(56) References Cited

U.S. PATENT DOCUMENTS

| | | | | |
|---|---|---|---|---|
| 5,038,716 A | * | 8/1991 | Olson | A01K 15/024 119/706 |
| 5,592,901 A | * | 1/1997 | Birmingham | A01K 15/024 119/706 |
| 5,884,586 A | | 3/1999 | Carbonelli | |
| 6,367,423 B1 | * | 4/2002 | Scheuer | A01M 29/30 297/219.1 |
| 7,171,922 B2 | * | 2/2007 | Lipscomb | A01K 15/024 119/706 |

(Continued)

FOREIGN PATENT DOCUMENTS

| CN | 208709077 U | 4/2019 |
|---|---|---|
| CN | 210227561 U | 4/2020 |

(Continued)

OTHER PUBLICATIONS

International Search Report and Written Opinion for PCT/US23/74157, mailed Mar. 13, 2024, 13 pages.

(Continued)

*Primary Examiner* — Daniel J Rohrhoff
(74) *Attorney, Agent, or Firm* — Leason Ellis LLP

(57) ABSTRACT

A scratchable side table placed adjacent to another piece of furniture may include comprising a base, a table top, frame extending between the base and the table top, and a scratch pad removably attached to the frame. The side table may be formed in an L-shape conducive to extending around and protecting a corner of the piece of furniture from scratches by, for example, a cat. The scratchable side table can thus function as both scratching post for a cat and a side table as a furnishing, while at the same time protecting, for example, a couch, from being scratched. This scratch pad is intended for scratching by a pet animal.

20 Claims, 13 Drawing Sheets

(56) References Cited

U.S. PATENT DOCUMENTS

| | | | |
|---|---|---|---|
| 7,681,524 B1* | 3/2010 | Hudson | A01K 1/0107 |
| | | | 119/28.5 |
| 8,448,601 B2 | 5/2013 | Boyer et al. | |
| 10,045,514 B2* | 8/2018 | Voronenko | A01K 15/02 |
| 2001/0045191 A1* | 11/2001 | Gear | A01K 15/024 |
| | | | 119/706 |
| 2004/0155514 A1* | 8/2004 | Talley | A47B 91/00 |
| | | | 297/463.1 |
| 2004/0194731 A1 | 10/2004 | Lineberry | |
| 2005/0039695 A1* | 2/2005 | Deming | A01K 15/024 |
| | | | 119/706 |
| 2012/0132149 A1* | 5/2012 | Yu | A01K 15/024 |
| | | | 119/706 |
| 2012/0291718 A1* | 11/2012 | Williams | A01K 15/024 |
| | | | 119/706 |
| 2015/0122198 A1* | 5/2015 | Voronenko | A47B 97/00 |
| | | | 119/706 |
| 2016/0106067 A1 | 4/2016 | Wedertz | |
| 2017/0339916 A1* | 11/2017 | Deraps | A01K 15/027 |
| 2019/0159430 A1* | 5/2019 | Szpetkowski | A01K 15/024 |
| 2019/0191664 A1* | 6/2019 | Xin | A47B 13/04 |
| 2019/0373858 A1 | 12/2019 | Stewart | |
| 2019/0377858 A1* | 12/2019 | He | G06V 10/141 |
| 2020/0146256 A1* | 5/2020 | Chen | F16B 5/0012 |
| 2021/0400915 A1 | 12/2021 | Monahan | |
| 2024/0341272 A1* | 10/2024 | Yeh | A01K 1/035 |

FOREIGN PATENT DOCUMENTS

| | | |
|---|---|---|
| CN | 211242484 U | 8/2020 |
| CN | 215077017 U | 12/2021 |
| KR | 200485602 Y1 | 3/2018 |
| KR | 102542592 B1 | 6/2023 |

OTHER PUBLICATIONS

"The Refined Feline Wooden Cat Furniture Bed Scratching Post, End Table with Durable Sisal Board Scratcher Pad for Kitty", amazon.com, retrieved Sep. 12, 2023, https://www.amazon.com/Refined-Feline-AFRAME-MA-Scratcher-Mahogany/dp/B01EOX3HOE?th=1.

"LitaiL Cat Furniture, Cat Shelves, Cat Bed with Soft Cushion, Sisal Cat Scratching Pat/Post, End Table, Sturdy Coffee Table, 4-in-1 Side Table for Living Room, Bedroom, Balcony -Dark Brown", amazon.com, retrieved Sep. 12, 2023, https://www.amazon.com/LitaiL-Furniture-Shelves-Cushion-Scratching/dp/B0BMV96K4V?th=1.

"A-Frame Cat Bed", therefinedfeline.com, retrieved Sep. 12, 2023, https://www.therefinedfeline.com/cat-beds/product/a-frame-cat-bed/.

"Durable Pet Cat Scratching Mat Sisal Furniture Chair 108x30cm Cat", walmart.com, retrieved Sep. 12, 2023, https://www.walmart.com/ip/Durable-Pet-Cat-Scratching-Mat-Sisal-Furniture-Chair-108x30cm-Cat/1196153477?wmlspartner=wlpa&selectedSellerId=101114713.

"NATUYA Furniture Protectors from Cats-Cat Furniture Protector-Cat Scratch Deterrent Cushion-Stretchable Anti-Scratch Sofa Cushion (Dark Gray, Right)", amazon.com, retrieved Sep. 12, 2023, https://www.amazon.com/NATUYA-Protectors-Protector-Cat-Cushion-Stretchable-Anti-Scratch/dp/B09F5ZYXWM?th=1.

\* cited by examiner

_US 12,453,335 B2_

SCRATCH PAD SIDE TABLE

CROSS-REFERENCE TO RELATED APPLICATIONS

This application claims the benefit of U.S. Provisional Application No. 63/406,825, filed Sep. 15, 2022, which is incorporated by reference herein in its entirety.

FIELD

Embodiments described herein generally relate to furniture, and in particular to furniture with a built-in scratch pad or board for a pet, such as a cat.

BACKGROUND

Scratch pads, boards and posts for pets are particularly useful for cats because they have a natural instinct to scratch their claws. This helps them express emotions, mark objects with their scent, and keep their nails clean and sharp. Cats will always find a place to fulfill this natural instinct whether they have a scratching post or not. Thus, it is important for cat owners to make sure they provide their pet with plenty of places to scratch, especially if they want to protect their furniture.

Scratch pads, boards and posts are often stand-alone structures, and are typically intended for placement on their own in an open space so as to be easily accessible by a pet. Accordingly, such structures are inconvenient in the sense that they take up space in the house that may otherwise be used for everyday furniture and, if frayed and damaged after use, can be unpleasant to look at.

SUMMARY

An object of the present invention is to provide a scratch device for a pet that is configured for placement directly adjacent to a piece of furniture so that the device may be seamlessly integrated into the piece of furniture in an aesthetically pleasing manner while still providing a useful scratch surface for a pet animal.

Another object of the present invention is to provide a side table that includes a scratch board or pad, where the side table is configured for placement directly adjacent to a piece of furniture, such as a couch or a bed, in a manner that allows the side table to appear as if it is an integral part of the piece of furniture. Another object of the present invention is to make the scratch board or pad easily replaceable.

A side table according to some embodiments of the present invention includes a base portion, a top portion, and a scratch pad portion extending between the base portion and the top portion, the scratch pad portion including a scratch pad configured for scratching by a pet animal.

In some embodiments, the scratch pad includes a type of material selected from the group consisting of: sisal, jute, cardboard, wood and combinations thereof.

In some embodiments, the scratch pad is made up carpet, rope, board, fabric or combinations thereof.

In some embodiments, the scratch pad portion further comprises a panel that supports the scratch pad.

In some embodiments, the panel includes at least one hook fastener configured to hold the scratch pad to a front portion of the panel.

In some embodiments, the panel includes at least one clip configured to attach to a corresponding end portion of the scratch pad.

In some embodiments, the side table further includes at least two posts extending between the base portion and the top portion, wherein each end portion of the scratch pad extends around a corresponding one of the at least two posts so that the scratch pad is pulled taut between the at least two posts.

In some embodiments, the base portion comprises at least one extending support piece.

In some embodiments, the top portion includes a table-top.

In some embodiments, the table-top extends laterally beyond the scratch pad portion.

In some embodiments, the side table is L-shaped.

In some embodiments, the side table is configured to be placed directly adjacent another piece of furniture in a matched fit.

In some embodiments, the side table is a scratchable side table, including a base, a scratch pad including material with a rough surface, a table top that extends laterally beyond the scratch pad, a panel extending between the base and the table top, and at least two posts extending between the base portion and the top portion. The posts are attached to the panel and the scratch pad. The panel includes at least one attachment fixture configured to hold the scratch pad to the panel, wherein the scratch pad can be removed from the panel. The table can be positioned adjacent to another piece of furniture such that the side table forms one cohesive unit with the adjacent piece of furniture.

In some embodiments, the rough surface is formed by at least one of a corrugated material, a roped material, or a piled material.

In some embodiments, the scratch pad is made of carpet, rope, board, fabric, or combinations thereof.

In some embodiments, the panel is made of sisal, jute, wood, cardboard, or combinations thereof.

In some embodiments, the base portion includes at least one extending support foot.

In some embodiments, the rough surface may be attached to the panel by a hook fastener or a hook and loop fastener.

In some embodiments, the table is L-shaped.

In some embodiments, the table is rectangular.

In some embodiments, the height of the side table can be adjusted using one or more risers.

In some embodiments, the scratchable side table includes a base, a table top having a flat, horizontal top surface, a rigid frame extending vertically from the base to the table top, a flexible scratch pad removably coupled to and wrapped around the frame, and the flexible scratch pad extending from the table top to the base and defining at least two adjacent sides of the side table between the table top and the base. The scratch pad has a rough outer surface and the table top is cantilevered over the rough outer surface.

In some embodiments, the base, the table top, and the scratch pad have an L-shaped horizontal cross section such that the side table forms an L-shape.

In some embodiments, the scratchable side table is configured to attach around a corner of a couch or another piece of furniture.

In some embodiments, the rough surface is formed by at least one of a corrugated material, a roped material, or a piled material.

In some embodiments, the scratchable side table further comprises stability extensions coupled to the base and protruding laterally therefrom.

In some embodiments, a furniture protection system includes a scratchable side table as described in any of the preceding embodiments, and a piece of furniture positioned adjacent to the scratchable side table.

In some embodiments, the furniture protection system is a couch, wherein the table top surface is positioned above the armrest of the couch.

In some embodiments, the height of the scratchable side table in the furniture protection system can be adjusted using risers, further wherein the height of the scratchable side table is aligned to be adjacent to the armrest of the couch.

DESCRIPTION OF THE DRAWINGS

Embodiments of the present invention will be described with references to the accompanying figures, wherein.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein comport with standards used by those experienced or skilled in the art to most effectively convey the substance of their work to others skilled in the art. In some instances, well-known methods, procedures, components, and elements have not been described in detail to avoid unnecessarily obscuring aspects of the disclosure.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, this disclosure has been prepared such that when a particular feature, structure, or characteristic is described in connection with an embodiment, it is within the knowledge of one skilled in the art to apply such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Figure 1:
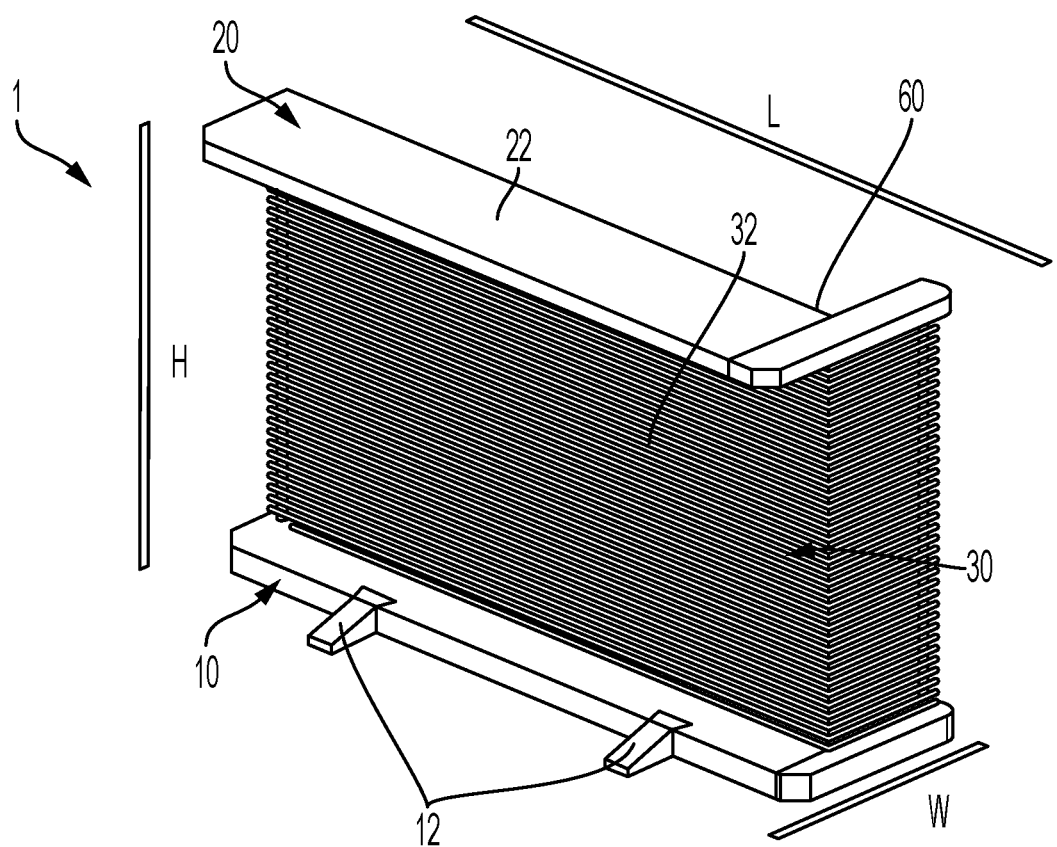
FIG. 1 is a top front side perspective view of a scratch pad side table according to an embodiment.
Figure 4:
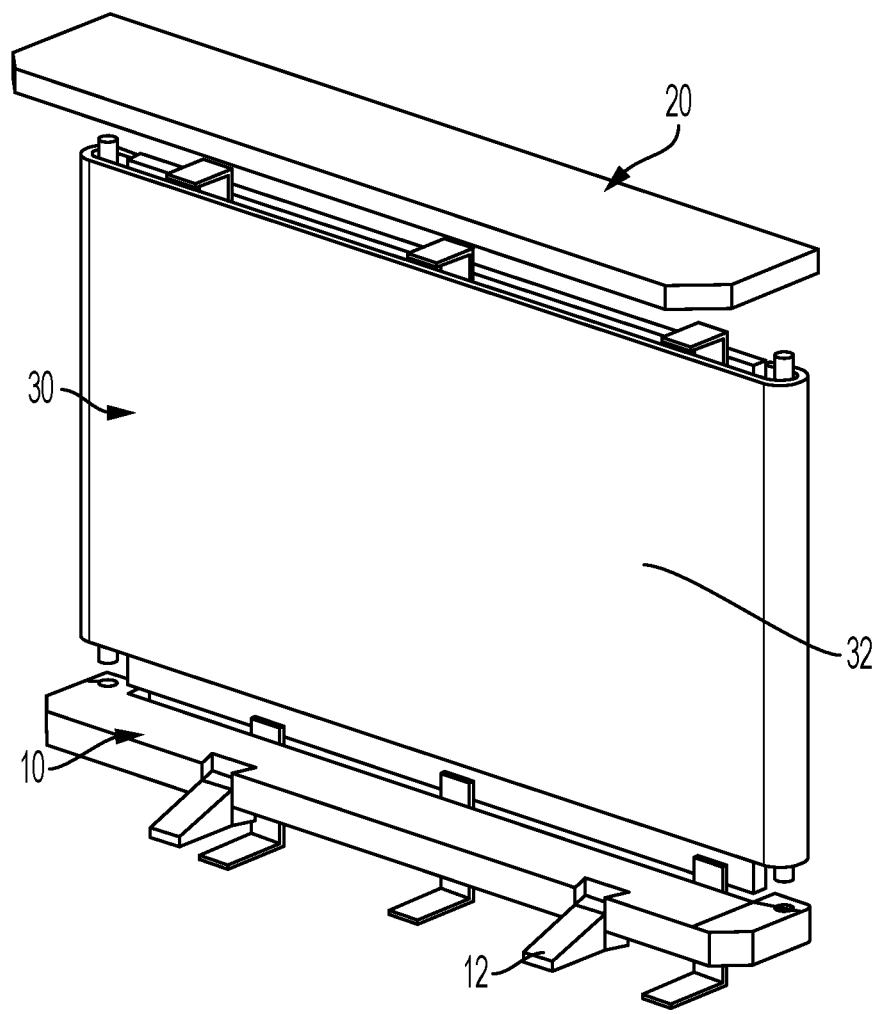
FIG. 4 an exploded top front side perspective view of a scratch pad side table according to the embodiment in FIG. 1.

FIG. 1 is a perspective view of a scratch pad side table, also referred to as a scratchable side table, generally designated by reference number 1, according to embodiments discussed herein. The scratch pad side table 1 includes a base portion 10, a top portion 20 and a scratch pad portion 30 extending between the base portion 10 and the top portion 20. The scratch pad side table 1 is shown in FIG. 1 having a generally L-shaped configuration so as to fit around and abut closely to a piece of furniture (e.g., around a corner of the piece of furniture), thus providing the appearance that the scratch pad table 1 is integrated with the piece of furniture. For example, if the piece of furniture is a couch, the scratch pad side table 1 may be disposed directly adjacent to an arm portion of the couch so as to extend to the side of and around the front of the arm portion. It should be appreciated that though the L-shape may provide certain benefits, the scratch pad side table 1 is not limited to an L-shape or any other particular shape, and in exemplary embodiments may be generally rectangular or square shaped (see, for example, FIGS. 4-6) or any other shape as necessary to be a matched fit with an adjacent piece of furniture. It should also be appreciated that the scratch pad side table 1 is not limited to placement adjacent to the arm portion of a couch and may also be placed adjacent to the rear of a couch (see, for example, FIG. 9). Thus, the term "side table" as used herein is not limited to tables placed to the right or left sides of a couch (i.e., near the armrests), and encompasses tables configured to fit around and/or abut closely to a piece of furniture.

In some embodiments, the scratch pad side table 1 may have a length L of 20 inches to 60 inches, a height H of 10 inches to 40 inches, and a width W of 5 inches to 30 inches. In a specific example embodiment, the side table 1 has a length L of 38.5 inches, a height H of 23 inches and a width W of 14 inches. It should be appreciated that these dimensions are examples and are not intended to be limiting in any way.

Figure 2:
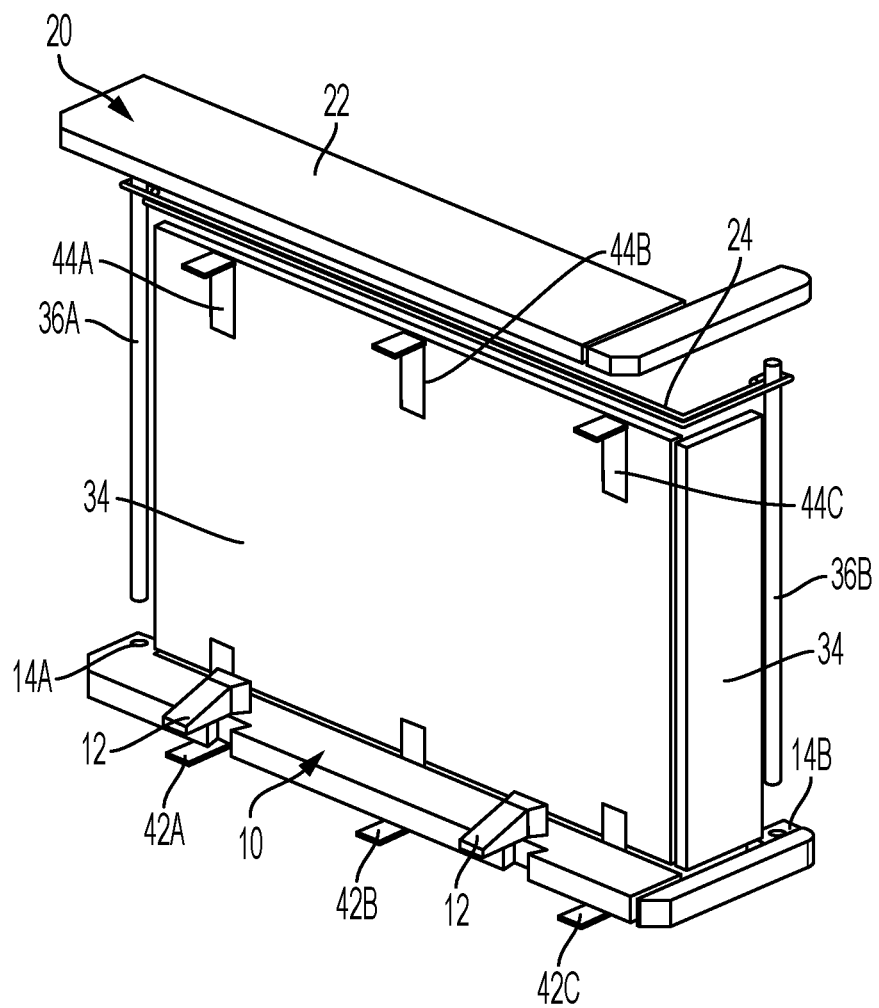
FIG. 2 is an exploded top front side perspective view of a scratch pad side table according to an embodiment.
Figure 3:
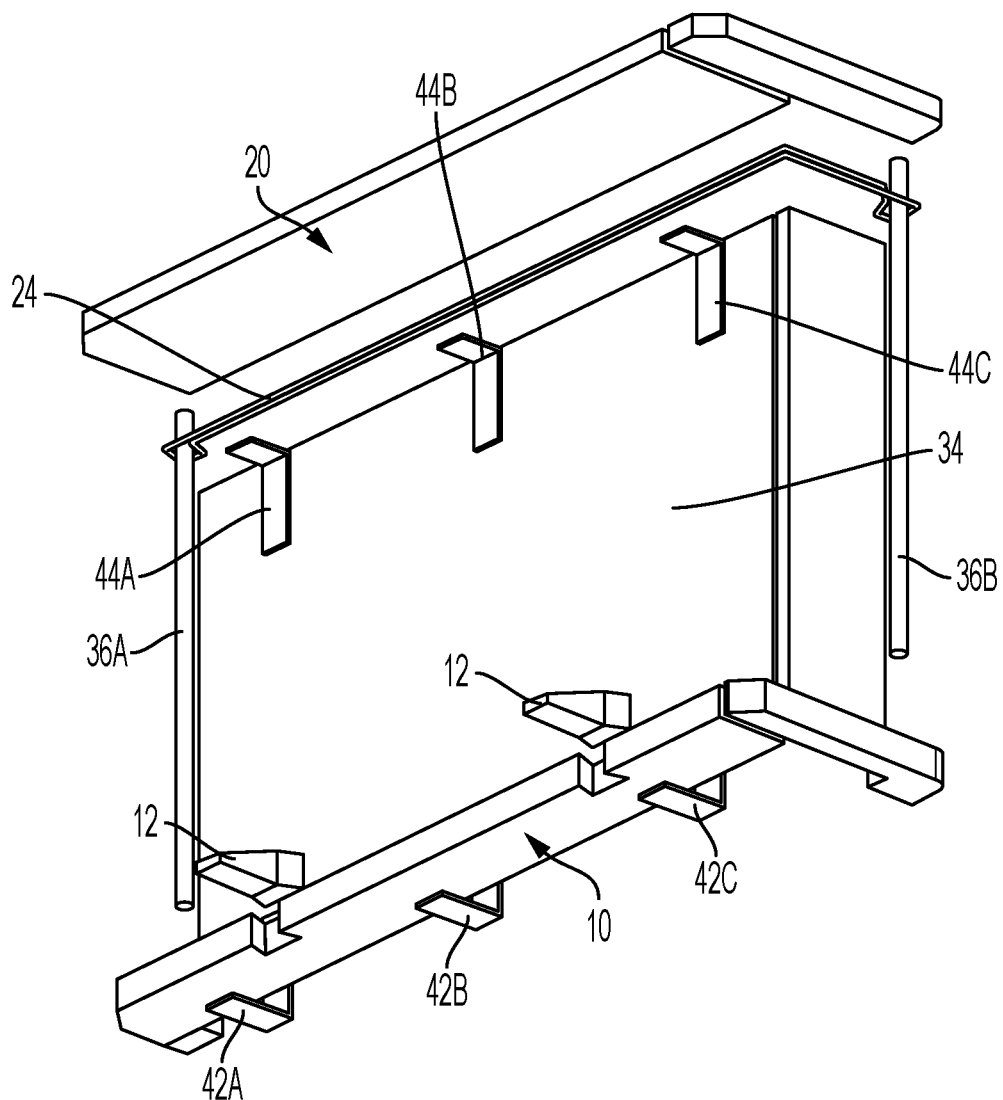
FIG. 3 is an exploded bottom front side perspective view of a scratch pad side table according to an embodiment.

The scratch pad portion 30 is made up of a scratch pad 32 and one or more panels (panels 34 as shown in FIGS. 2 and 3) that support the scratch pad 30. In some embodiments, the scratch pad 30 may be made of scratch pad material such as, for example, sisal, jute, hemp, cardboard, synthetic materials, wood or combinations thereof. The scratch pad 32 may be carpet, rope, board, fabric, or combinations thereof.

The base portion 10 may be configured for direct placement onto a floor and thus may have a generally flat bottom surface. The base portion 10 may include support structures such as, for example, extending support pieces 12.

The top portion 20 may include a table top 22 configured for holding items, such as, for example, lamps, ash strays, decorative pieces, etc.

As shown in FIGS. 2 and 3, the base portion 10 may be attached to the scratch pad portion 30 by a series of bottom brackets 42A, 42B, 42C and the top portion 20 may be attached to the scratch pad portion 30 by a series of top brackets 44A, 44B, 44C. Although three top and three bottom brackets are shown, it should be appreciated that any number and arrangement of brackets may be used to attach the components of the side table 1 together. In some embodiments, screws are used to attach the top and bottom brackets to the base portion 10, top portion 20, and scratch pad portion 30. In some embodiments, other fastening elements may be used to attach the top and bottom brackets to the base portion 10, top portion 20, and scratch pad portion 30, such as, for example, clamps, nails, screws, adhesive and combinations thereof. In some embodiments, fastening elements other than brackets may be used to attach the base portion 10 and top portion 20 to the scratch pad portion 30, such as, for example, clamps, nails, screws, adhesive and combinations thereof.

As discussed, the side table 1 may have any suitable profile so as to abut closely with an adjacent piece of furniture in a matched fit. Accordingly, the base, top, and scratch pad portions 10, 20, 30 may each be made of any number of separate elements that are joined together to form integral panels. For example, each of the base, top, and scratch pad portions 10, 20, 30 may include a main body panel and one or more side panels as appropriate so as to conform to the shape of an adjacent piece of furniture.

In some embodiments, posts 36A, 36B may be arranged at both ends of the scratch pad portion 30. The posts 36A, 36B may extend vertically between base portion 10 and top portion 20. Opposing end portions of the scratch pad 32 may be wrapped around a corresponding one of the posts 36A, 36B and held to the back of the panels 34 by fastening components, such as, for example, clips 39 as shown in FIG. 6. Though some features (e.g., for attaching scratch pad 30) are shown and described here with reference to the rectangular configuration (e.g., FIGS. 4-6, 9), it should be understood that they are equally applicable to the L-shaped configuration (e.g., FIGS. 1-3, 8, 10-14).

Figure 7:
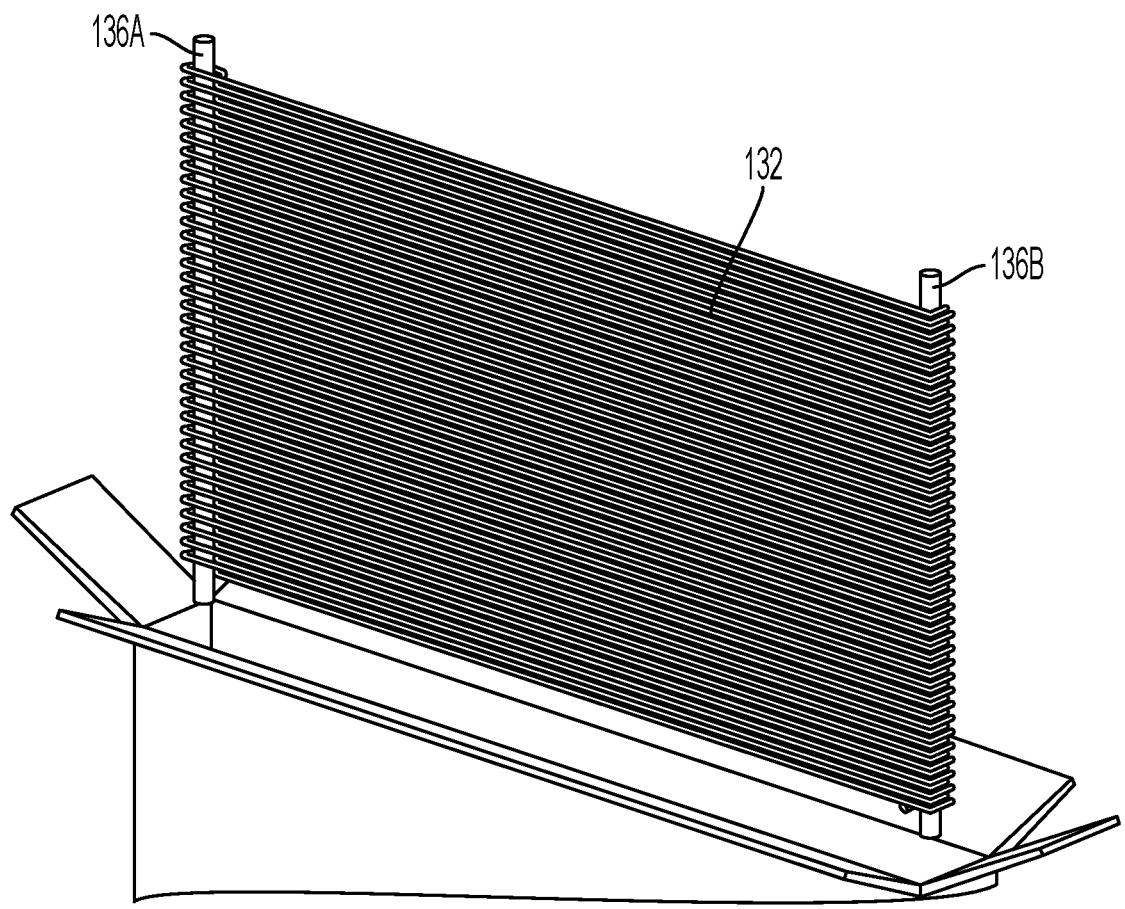
FIG. 7 is a replacement scratch pad according to an embodiment.

To facilitate smooth and tight wrapping around the posts 36A, 36B, the posts 36A, 36B may have a rounded profile (e.g., cylindrical). The posts 36A, 36B may be removable from the top and bottom portions 10, 20 so that the scratch pad 32 may be replaced after being worn down from use. In this regard, FIG. 7 shows a replacement scratch pad 132 that is made available with replacement posts 136A, 136B as a replacement kit. The worn scratch pad 32 and associated posts 36A, 36B may be removed from the side table 1 and replaced with the new scratch pad 132 and posts 136A, 136B. As shown most clearly in FIG. 2, the posts 36A, 36B may be inserted into corresponding openings 14A, 14B in the base portion 10 and held in place at the top of the side table by a fastening clip 24. The old scratch pad 32 and posts 36A, 36B may be removed by pulling the posts 36A, 36B out of the openings 14A, 14B and fastening clip 24, and the new replacement scratch pad 132 and posts 136A, 136B may installed by pushing the bottom portions of the posts 136A, 136B into the openings 14A, 14B and the top portions of the posts 136A, 136B into the fastening clip 24.

Figure 5:
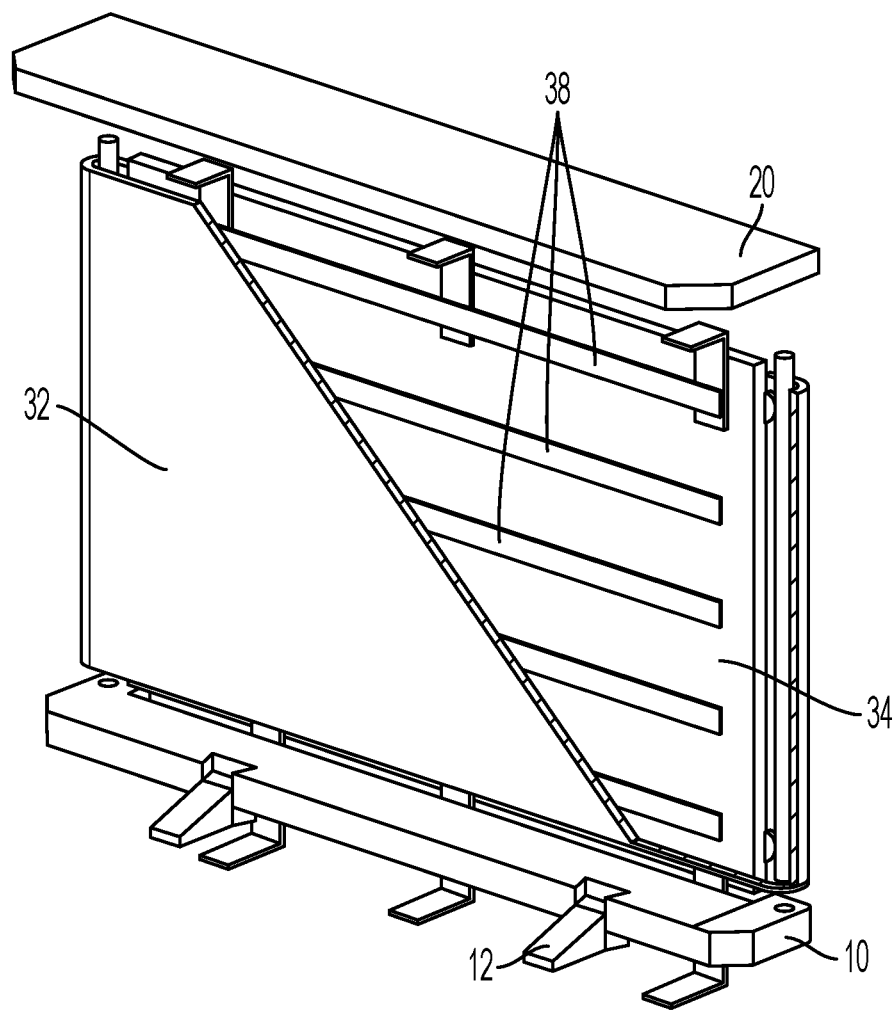
FIG. 5 is an exploded top front side perspective view of a scratch pad side table with a scratch pad surface partially removed according to an embodiment.
Figure 6:
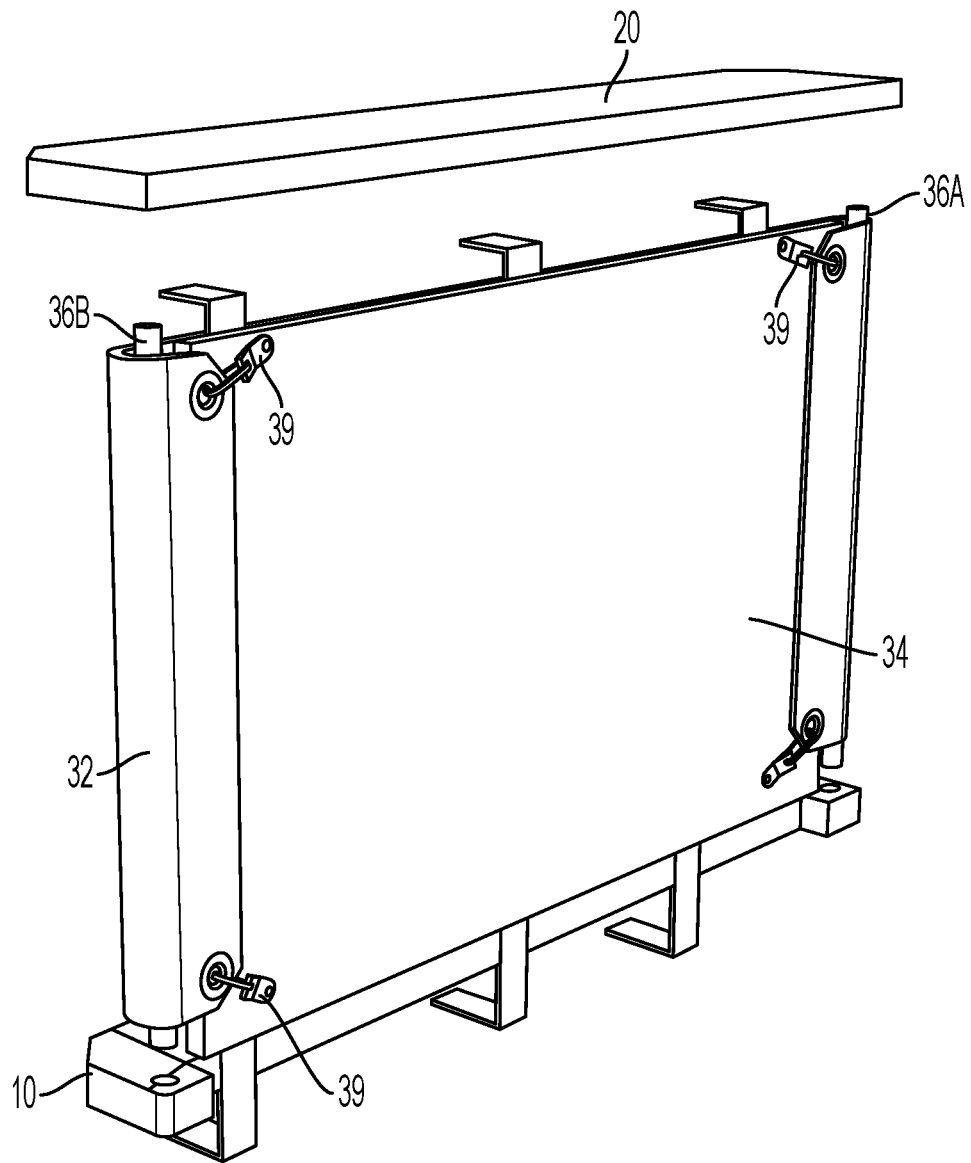
FIG. 6 is an exploded back side perspective view of a scratch pad side table according to the embodiment in FIG. 1.

As shown in FIG. 5, the scratch pad 32 may be held taut against the front of the panels 34 by additional fastening elements, such as, for example, hook-and-loop fasteners 38. In this regard, the front of the panels 34 may include one of the hook and loop components of a hook-and-loop fastener 38 and the back of the scratch pad 32 may include the other of the hook and loop components of the hook-and-loop fastener 38. Alternatively, the scratch pad 32 may be fastened directly to hook components disposed on the front of the panels 34 in a loopless fastener configuration.

Figure 8:
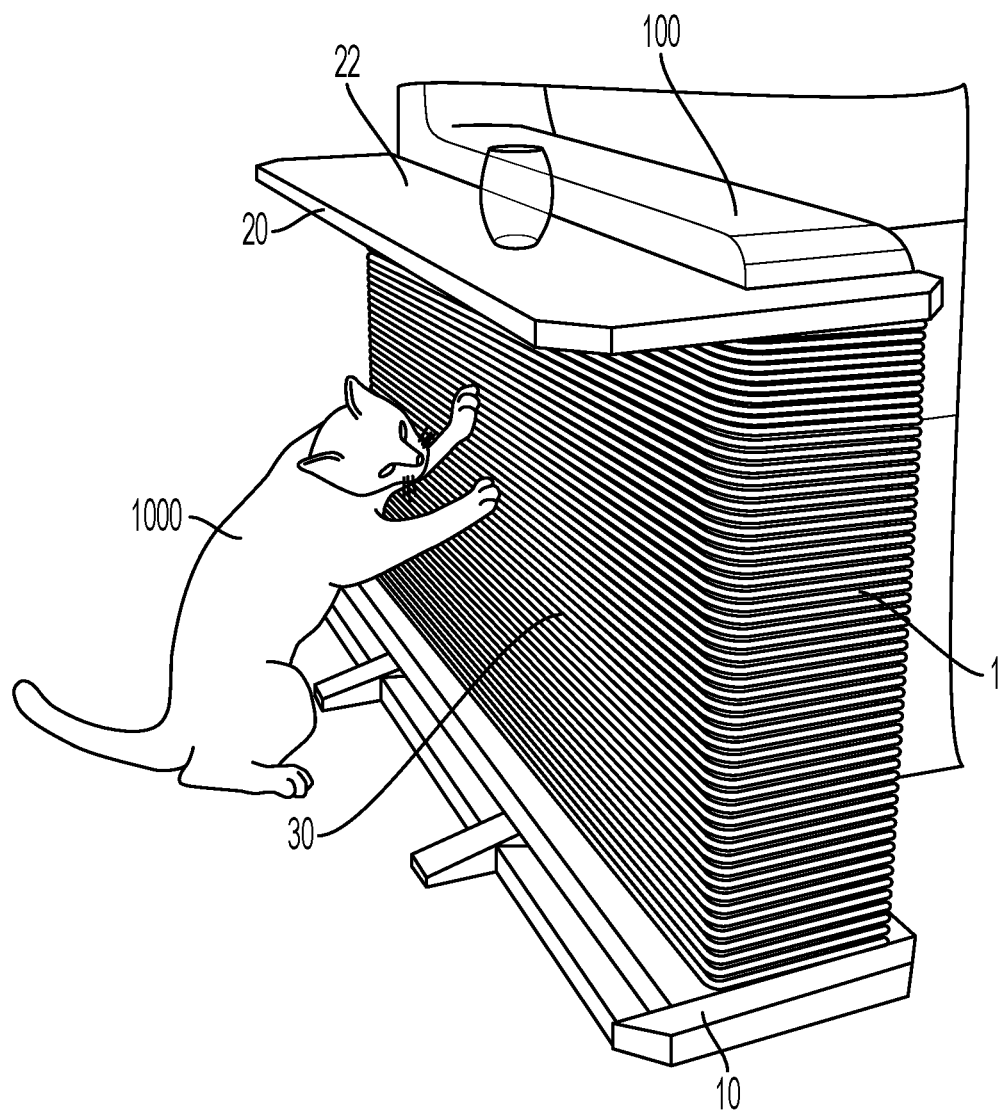
FIG. 8 is a photograph of a scratch pad side table according to an embodiment.

FIG. 8 shows a pet cat 1000 interacting with a scratch pad side table 1 according to an embodiment of the present invention. The side table 1 is shown abutted against the side arm of a couch 100, with a drinking glass resting on the table top of the side table 1 while the pet cat 1000 scratches its claws on the scratch pad portion of the side table 1. Accordingly, the side table 1 is able to protect the couch 100 from damage while providing a pet with a scratch surface. Thus, the side table 1 with couch 100 is together a furniture protection system whereby the side table 1 protects surfaces of the couch 100 from being scratched by the cat 1000, while providing a safe and healthy opportunity for the cat 1000 to scratch the scratch pad 30 of the side table 1.

As shown in FIG. 8, the side table 1 extends vertically to cover the majority of the couch lower side surface, which is within easy reach of the cat 1000. It also wraps around a front corner of the couch 100 to continuously extend that same protection to at least a portion of the couch lower front surface, where the couch lower front surface is perpendicular to the couch lower side surface. This essentially covers and protects the armrest area of the couch 100, while not impeding access of use of the seats of the couch, and further providing a table top surface 22 at a convenient location for a user of the couch. The L-shape of the side table 1 allows its inner corner 60 to fit closely around an outer corner of a piece of furniture such as the couch 100, to thereby entirely protect the corner of the furniture in addition to adjacent sides.

Figure 9:
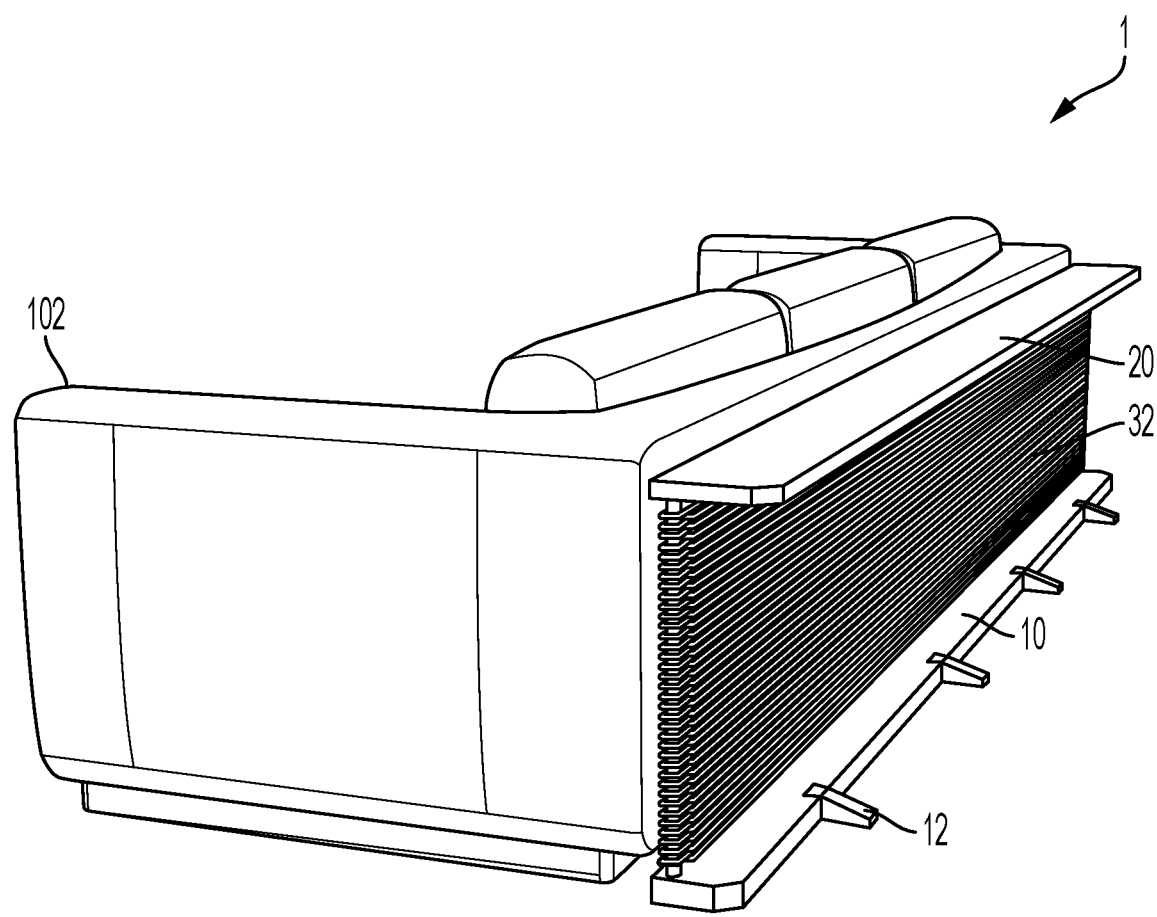
FIG. 9 is a top front side perspective illustrating a scratch pad side table embodiment configured to be placed adjacent to the rear of a couch or sofa.
Figure 10:
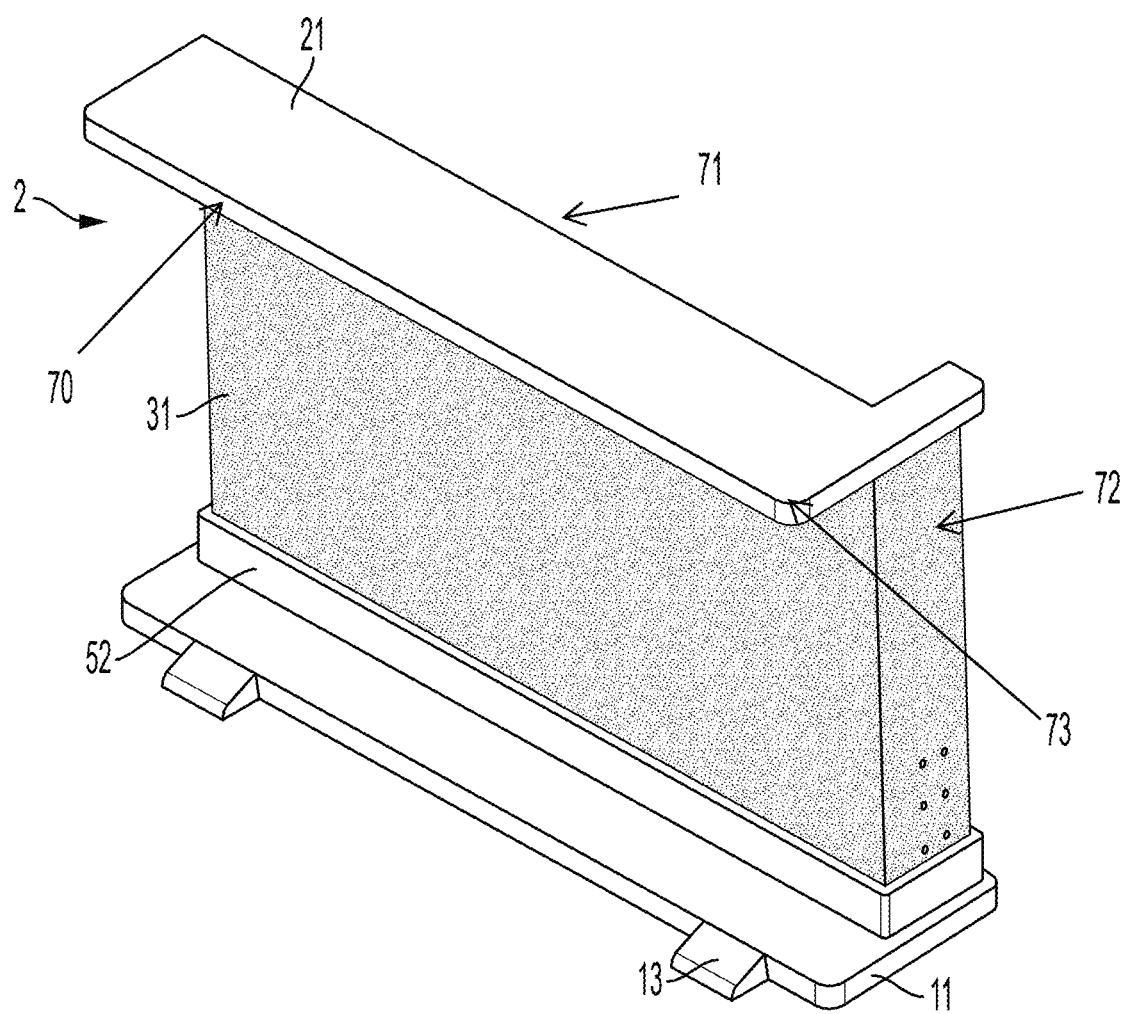
FIG. 10 is a top front side perspective view of a scratch pad side table according to an embodiment.

As shown in FIG. 9, side table 1 of the invention is not limited solely to side tables but includes other tables, such as sofa tables, which are configured to be placed adjacent to the back of a sofa or other large piece of furniture.

Further features and benefits of a scratchable side table are shown and described below with reference to scratchable side table 2, shown in FIGS. 10-14. It should be understood that such features of side table 2 may be applicable to the side tables 1 described above, and vice versa. The side table 2 includes a base 11, a scratch pad 31, a table top 21 that extends laterally beyond the scratch pad 31, and a frame 46 extending between the base 11 and the table top. The table top 21 may be attached to the frame 46 in an off-centered manner, resulting in an outer edge 70 of the table top being located further away from the frame 46 as compared to an inner edge 71 of the table top 21. This extension of the table top away from the inner edge can be described as a first extension. The frame 46 may be formed of panels. For example, the frame may be formed of a first panel 47 and a second panel 48. To form and support the L-shape of side table 2, the first panel 47 and the second panel 48 may be positioned perpendicularly to each other. They may meet along adjacent vertical edges to form a corner (e.g., inner corner 61 and outer corner 62). The frame may also be formed of an end portion 72 of the first panel 47 at the opposite end from where the first panel 47 meets the second panel 48. The panels 47 and 48 may have the same height, but different widths. For example, the first panel 47 may have a greater width than the second panel 48 so that the first panel 47 can protect the side of a couch, while the second panel 48 can protect the front of the couch's armrest without interfering with use of the couch. For example, the first panel 47 may have a width that is more than 3 times the width of the second panel 48 (e.g., between 3 and 10 times the width of the second panel 48). The width of the second panel 48 may also have a width that is greater than the width of the end portion of the first panel 47. The table top 21 may have a corner 73 that corresponds to the inner corner 61 and outer corner 62 formed by the first panel 47 and the second panel 48, and the table top 21 may extend in a manner corresponding to that of the second panel 48. This can be described as a second extension.

The scratch pad 31 may be removably attached to the frame 46 such that the frame 46 both structurally supports the table top 21 above the base 11 and provides the foundation upon which the scratch pad 31 is affixed. The frame 46 includes at least one attachment fixture 50 configured to removably hold the scratch pad 31 to the frame 46. The side table 2 can be L-shaped, as described in FIG. 10 (similar to the side table 1 shown in FIGS. 1-3 and 8) or alternatively can be rectangular in shape (similar to the side table 1 shown in FIGS. 4-6 and 9). These different shapes for side table 2 can be utilized to fit different types of furniture.

Figure 11:
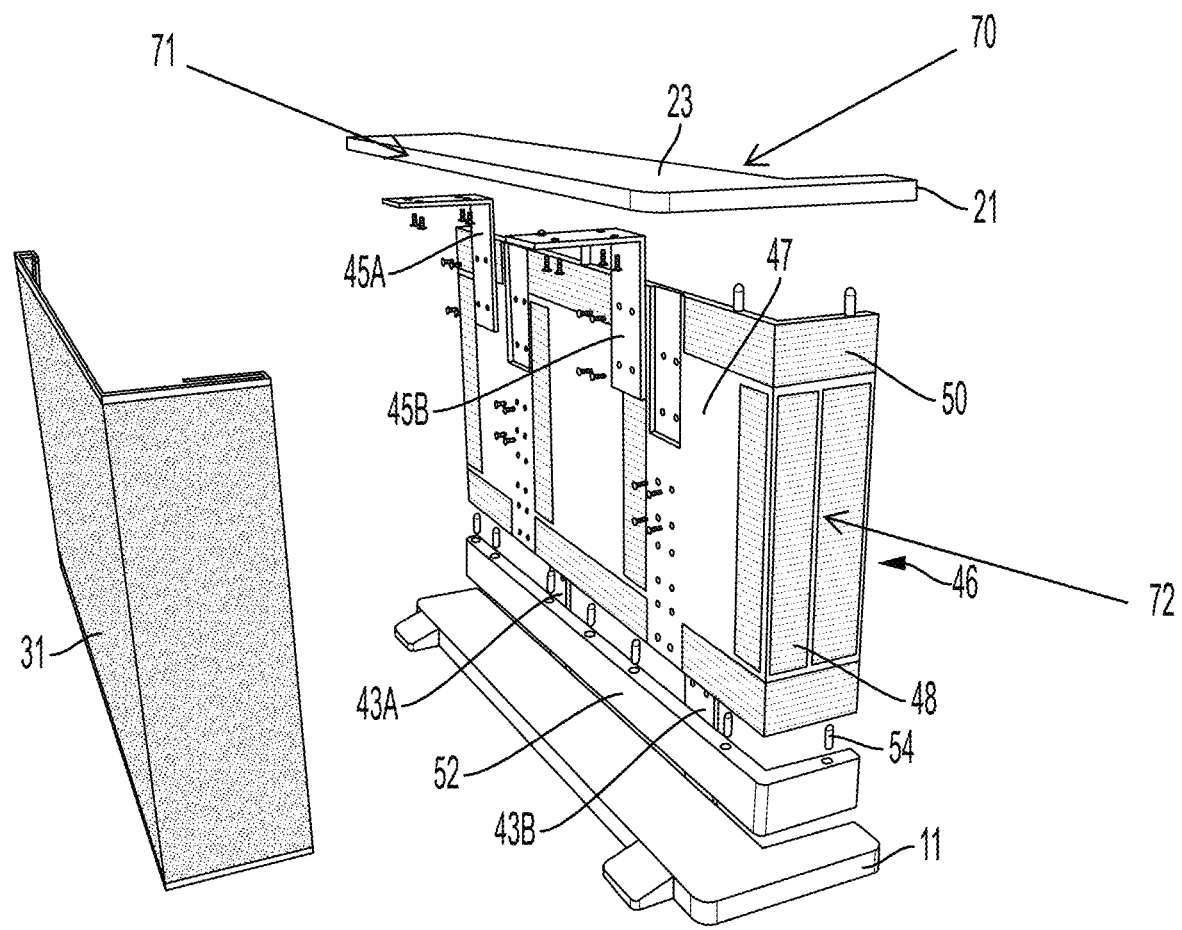
FIG. 11 is an exploded top front side perspective view of the scratch pad side table of FIG. 10.

FIG. 11 shows an exploded view of the side table 2. As mentioned above, the side table 2 may have any of the features described above with respect to side table 1, so description of such features generally will not be repeated in full. As shown, the base 11 may be attached to the frame 46 by one or more bottom brackets 43A and 43B and the table top 21 may be attached to the frame 46 by one or more top brackets 45A and 45B. Although two top and two bottom brackets are shown, it should be appreciated that any number and arrangement of brackets may be used to attach the components of the side table 1 together. In some embodiments, screws or other attachment fixtures are used to attach base 11, table top 21, and frame 46.

Figure 13:
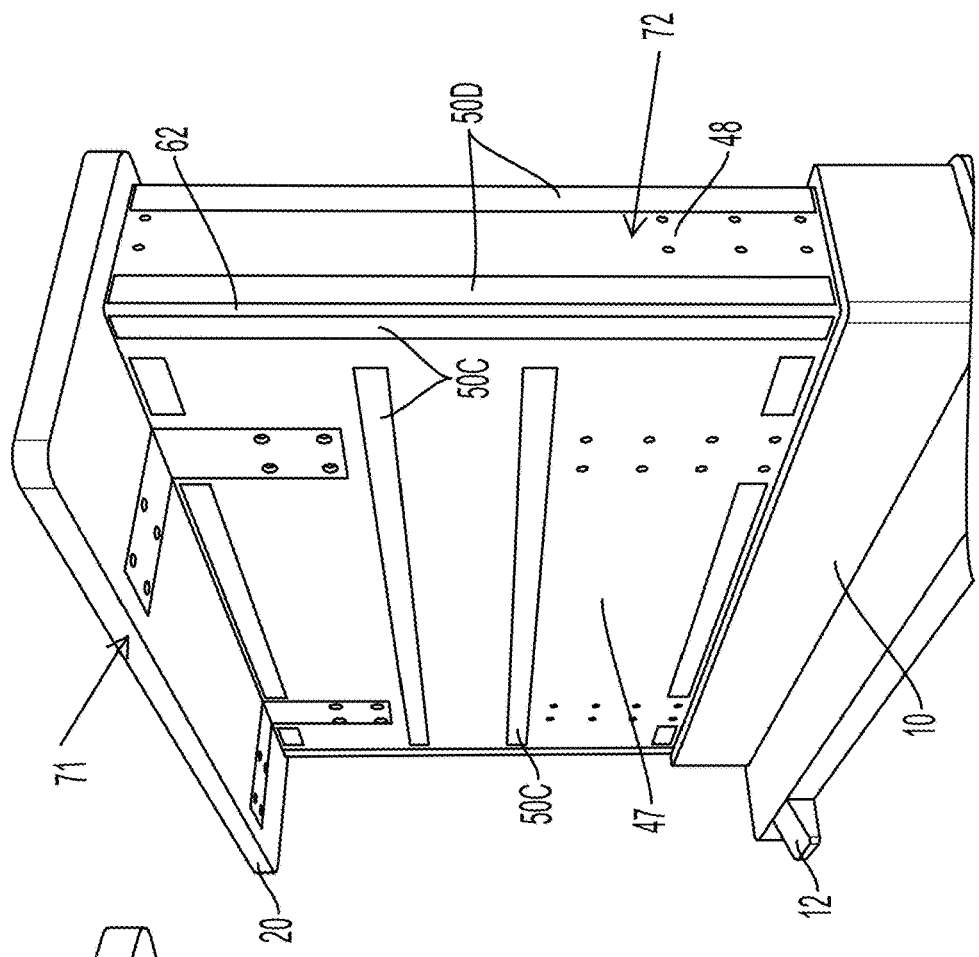
FIG. 13 is a front side perspective view of the scratch pad side table of FIG. 10 with scratch pad removed.
Figure 12:
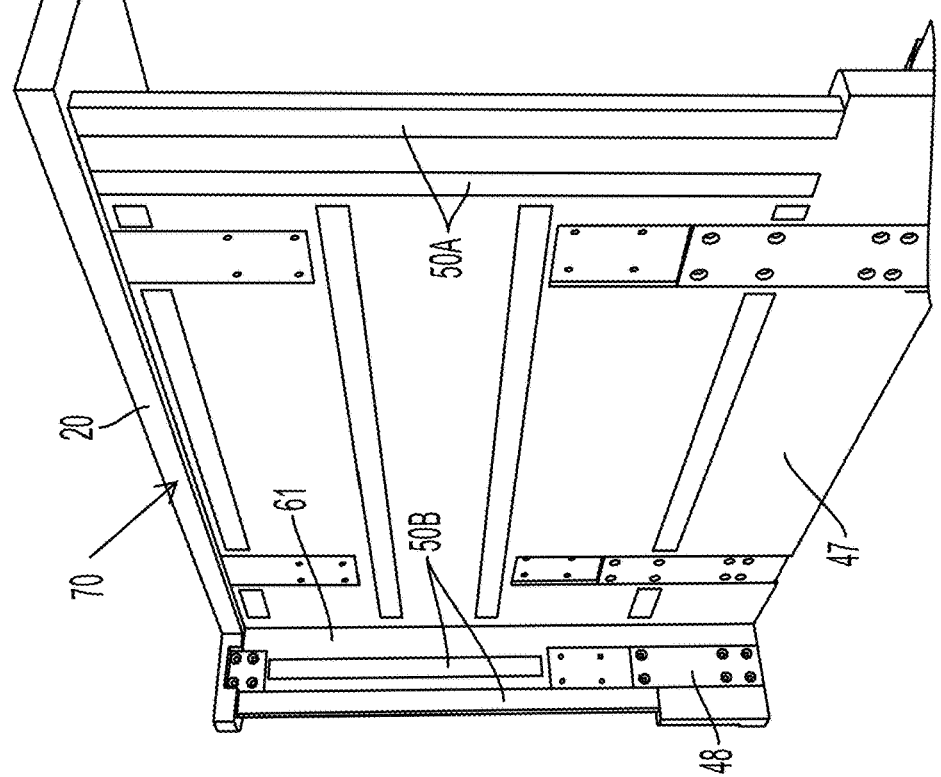
FIG. 12 is rear side perspective view of the scratch pad side table of FIG. 10 with scratch pad removed.

Furthermore, FIG. 11 shows how the scratch pad 31 can be removably attached to the frame 46 via the use of hook-and-loop fastener strips 50. One example of suitable hook-and-loop fasteners is VELCRO® fasteners. An example placement of such hook-and-loop fasteners 50 is shown in FIGS. 12 and 13, which show hook-and-loop fastener strips 50A on the inner surface of the first panel 47 of the frame 46, hook-and-loop fastener strips 50B on the inner surface of the second panel 48 of the frame 46, hook-and-loop fastener strips 50C on the outer surface of the first panel 47 of the frame 46, and hook-and-loop fastener strips 50D on the outer surface of the second panel 48 of the frame 46. These hook-and-loop fasteners allow scratch pad 31 to be placed taut against panel 48 and be held in that position for use as a cat scratching material.

To facilitate secure attachment of scratch pad 31 to frame 46 even while scratched by a cat, since the cat will be scratching at the outer sides of frame 46 (see, e.g., FIG. 8), the strips 50C and 50D extend vertically along edges of panels 47, 48 and at the corner formed thereby. On the larger of the panels (first panel 47) strips 50 extend at positions between the vertical edge strips 50C to maintain strong attachment throughout the entire outer side of frame 46. To facilitate this, as shown, some strips 50C extend horizontally between vertical strips 50C, extending over more than 50% of the width of the first panel 47 (e.g., more than 80% of the width of the first panel 47). On the inner side of frame 46, strips 50A and 50B extend along the edges of first panel 47 and second panel 4 where scratch pad 31 wraps around frame 46, to thereby secure scratch pad 31 taught against frame 46. Scratch pad 31 may extend only partially over inner side surfaces of frame 46, enough to secure scratch pad 31 at the edges of the rear of frame 46. In some embodiments scratch pad does not extend across an entirety of the width of the rear side of frame 46.

Strips 50A, 50B, 50C, 50D may be the hook side or the loop side of a hook-and-loop-type fastener. The other of the hook side or the loop side may be attached to a rear surface of the scratch pad 31 at corresponding positions (or over a large area of the rear surface of the scratch pad 30, e.g., all of it) such that the hook side and the loop side cooperate to releasably attach scratch pad 31 to frame 46. In some embodiments, scratch pad 31 may be formed of a material that naturally forms loops upon which the hook side of hook-and-loop fasteners can attach. In such case, all of strips 50A, 50B, 50C, 50D may be the hook side, and may attach anywhere on the rear side of scratch pad 31, thereby providing greater flexibility in placement and manufacturing.

The scratch pad 31 may be flexible, in order to wrap tightly around the frame 46. And the frame 46 may be rigid, in order to tightly hold the scratch pad 31 in position against scratching activity of a cat, as well as to support the general structure of the side table 2. The frame 46 may be extend behind the entirety of the scratch pad 31, to thereby provide continuous support and backing against forces imparted by a scratching cat.

FIG. 11 also shows how the height of table 2 can be adjusted with riser 52. Riser 52 can be, for example, one or more panels that act as a spacer to raise frame 46 higher, while still presenting a full, closed outer appearance. One may wish to use a riser to raise the height of side table 2 in order to place the table top surface 23 of table top 21 at a more convenient height relative to the height of an adjacent piece of furniture. For example, so that the table top surface 23 is aligned with or near the top of the couch armrest, and can be easily reached by a person sitting on the couch. Since the side table 2 can be used with a variety of furniture or couch styles that may have different heights, adjustability can help to maximize its usefulness and flexibility in any home environment.

In some embodiments, riser 52 can be attached between frame 46 and base 11. It can extend the entirety of the interface between frame 46 and base 11. The riser 52 has a height, which corresponds to the height by which table top 21 is raised when the riser 52 is used. For example, the riser 52 may have a height between 1 and 12 inches (e.g., 1, 2, 4, 6, 8, 10, or 12 inches). In some embodiments, a side table system includes multiple risers 52 of different heights, which can be incorporated individually or in combination between the frame 46 and the base 11 to achieve a desired height of side table 2 and a desired position of table top 21. For example, such a side table system may include two risers 52 of different heights, for example one riser 2 inches in height and another riser 4 inches in height.

The riser 52 may protrude outwardly from frame 46, to thereby create a recess above the riser 52 in which scratch pad 31 may be positioned. This can help in positioning the scratch pad 31 in an aligned position along frame 46 and support scratch pad 31 in such position. The thickness of the scratch pad 31 may be similar to the distance that frame 46 protrudes outwardly from frame 46, so that when applies, scratch pad 31 and outer surfaces of the riser 52 may appear aligned.

The riser 52 may be incorporated between the base 11 and the frame 46 and secured via any suitable fixture or mechanism, including, for example, wooden pegs 54. Suitable materials for the risers 52 include, but are not limited to wood, metal, and combinations thereof. The riser can be used to adjust the height of any of the side tables described herein to match that of the piece of furniture the side table is being coupled with.

Figure 14:
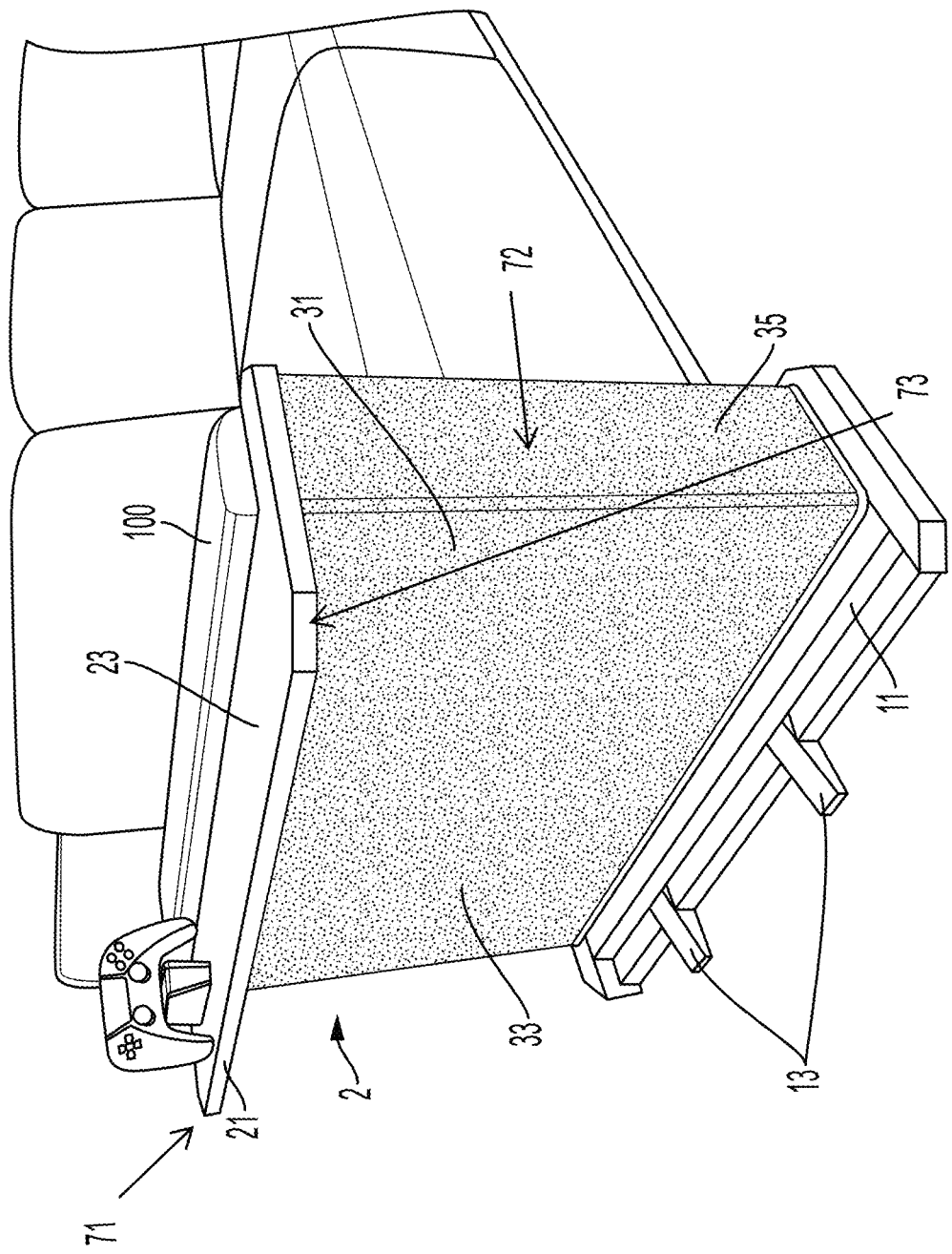
FIG. 14 is a top perspective view of furniture protection system including the scratch pad side table of FIG. 10.

FIG. 14 shows a scratch pad 31 attached to the side table 2 described above. The scratch pad 31 is made of a rough material that can encourage a cat to scratch, and can be replaced when such scratching has sufficiently damaged the material (and saved the couch from such damage in the process). To this end, the scratch pad 31 can be formed by at least one of a corrugated material, a roped material, or a piled material. Examples of such materials include, but are not limited to, carpet, rope, board, fabric, sisal, jute, wood, cardboard, or combinations thereof.

FIG. 14 shows the side table 2 with the couch 100 thereby forming a furniture protection system, similar to that described for side table 1 in FIG. 8. The purpose of this furniture protection system is provide pets with a scratching surface while protecting the couch.

As shown, the width of a first side 33 (corresponding in this case to the first panel 47 of the frame 46) of scratch pad 31 of side table 2 extends along and covers the majority of (in this case the entire) the width of the side of the couch 100 below the armrest. The height covers the majority of (in this case nearly the entire) the height of the side of the couch 100 below the armrest. In this way, the side of the couch is protected from cat scratches, and the cat has an easily accessible place to exercise its scratching instinct. Note in FIG. 14 the height of table top surface 23 is slightly below the top of the armrest of the couch 100. This may be the most convenient position for the user of side table 2. However if desired, the user may add a riser 52 to adjust the height upward to align with the top of the armrest. Such flexibility gives the user many options.

As further shown in FIG. 14, the width of a second side 35 (corresponding in this case to the second panel 48 of the frame 46) of scratch pad 31 of side table 2 extends along and covers a portion of the front of the couch, the portion corresponding to the front of the armrest, and not interfering with the front of a seat of the couch 100. In this way, the front of the armrest is protected from scratches similarly to the side, and the side is further protected by limiting a cat's access to get behind the side table 2, between the side table 2 and the couch 100.

First side 33 and second side 35 of scratch pad 31 may be positioned perpendicularly to each other and seamlessly transition to each other around a corner of side table 2, to thereby form an L-shape.

Table top 21 base 11, and riser 52 (if used) may similarly have an L-shape to corm an overall L-shape of side table 2.

As further shown in FIG. 14, table top 21 may extend out over scratch pad 31 such that it is cantilevered over the rough outer surface of scratch pad 31. This can allow for a larger surface area of table top surface 23, which improves its utility as a table. It can also allow for protection for a cat using scratch pad 31 from items inadvertently falling off the table top 21 by giving the cat space beneath table top 21 from which to scratch pad 31. Further, by table top 21 being cantilevered over scratch pad 31, scratch pad 31 is able to be positioned substantially recessed relative to the outer edges of table top 21, closer to the couch 100, to thereby more closely protect the surfaces of couch 100.

To provide improved stability for such cantilevered table top 21, side table 2 may include one or more support extensions 13 that extend from the base 11 in the same direction that table top 21 is cantilevered away from scratch pad 31. This can improve the outward stability of side table 2 while still allowing it to maintain a slim appearance and small footprint.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A scratchable side table, comprising:
   a scratch pad comprising material with a rough surface;
   a base disposed below the scratch pad;
   a table top disposed above the scratch pad; and
   a panel extending between and coupled to the base and the table top, the panel comprising:
   at least one attachment fixture configured to hold the scratch pad to the panel, wherein the scratch pad can be removed from the panel; and
   a supporting frame extending between the base and the table top, wherein the supporting frame is attached to the attachment fixture and the scratch pad,
   wherein the table top is attached to the panel in an off-centered manner, resulting in an outer edge of the table top being located further away from the panel and the scratch pad compared to an inner edge of the table top, for permitting the scratchable side table to be positioned adjacent to one end of a piece of furniture.

2. The side table of claim 1, wherein a front end of the table top comprises a first extension that extends laterally from the inner edge of the table top, wherein the panel abuts an underside of the first extension, for permitting the scratchable side table to be positioned to partially cover a front of the adjacent piece of furniture.

3. The side table of claim 2, wherein a front end of the base comprises a second extension that extends laterally from the inner edge of the base, wherein the first extension is located directly above the second extension, wherein the panel extends between the first extension and the second extension.

4. The side table of claim 1, wherein the base comprises at least one extending support foot located along an outer edge of the base.

5. The side table of claim 1, wherein the supporting frame comprises a first panel, a second panel, and an end portion opposite the second panel, wherein the first panel is located between the second panel and the end portion, wherein a width of the second panel is greater than a width of the end portion.

6. The side table of claim 1, wherein the attachment fixture is a hook fastener or a hook and loop fastener.

7. The side table of claim 1, wherein the supporting frame comprises one or more brackets attached to an underside of the table top, wherein the one or more brackets support an overhang portion of the table top that extends laterally beyond the panel.

8. The side table of claim 1, wherein the height of the side table is adjustable.

9. The side table of claim 8, wherein one or more risers are incorporated between the base and the table top.

10. The side table of claim 1, wherein the panel is disposed along the inner edge of the base.

11. A scratchable side table, comprising:
a scratch pad comprising material with a rough surface;
a base disposed below the scratch pad;
a table top disposed above the scratch pad; and
a panel extending between the base and the table top, the panel comprising:
at least one attachment fixture configured to hold the scratch pad to the panel, wherein the scratch pad can be removed from the panel; and
a supporting frame extending between the base and the table top, wherein the supporting frame is attached to the attachment fixture and the scratch pad, wherein a portion of the supporting frame additionally extends asymmetrically in one direction that is perpendicular to a length of the base and a length of the tabletop;
wherein a front end of the table top includes a first extension that extends laterally from an inner edge of the table top, wherein the panel abuts an underside of the first extension, the first extension being configured for placement along a front portion of an adjacent piece of furniture.

12. The side table of claim 11, wherein a front end of the base comprises a second extension that extends laterally from an inner edge of the base, wherein the first extension is located directly above the second extension, wherein the panel extends between the first extension and the second extension.

13. The side table of claim 11, wherein the supporting frame comprises one or more brackets attached to an underside of the table top, wherein the one or more brackets support an overhang portion of the table top that extends laterally beyond the panel.

14. The side table of claim 11, wherein the base comprises at least one extending support foot located along an outer edge of the base, the outer edge being opposite an inner edge of the base.

15. The side table of claim 11, wherein the height of the side table is adjustable.

16. The side table of claim 15, wherein one or more risers are incorporated between the base and the table top.

17. A scratchable side table, comprising:
a scratch pad comprising material with a rough surface;
a base disposed below the scratch pad, the base extending in one lateral direction beyond the scratch pad, the base comprising:
an outer edge in a lateral direction said base is extending,
an inner edge opposite the outer edge, and
at least one extending support foot along the outer edge;
a table top disposed above the scratch pad that extends in said lateral direction beyond the scratch pad; and
a panel extending between the base and the table top, the panel comprising:
at least one attachment fixture configured to hold the scratch pad to the panel, wherein the scratch pad can be removed from the panel; and
a supporting frame extending between the base and the table top, wherein the supporting frame is attached to the attachment fixture and the scratch pad, wherein a portion of the supporting frame additionally extends asymmetrically in one direction that is perpendicular to a length of the base and the length of the tabletop;
wherein the panel is disposed along the inner edge of the base, for permitting the scratchable side table to be positioned adjacent to one end of a piece of furniture.

18. The side table of claim 17, wherein the supporting frame comprises one or more brackets attached to an underside of the table top, wherein the one or more brackets support an overhang portion of the table top that extends laterally beyond the panel.

19. The side table of claim 17, wherein the height of the side table is adjustable.

20. The side table of claim 19, wherein one or more risers are incorporated between the base and the table top.

* * * * *